July 13, 1965     A. M. MARFUT     3,194,998

MAGNETIC TEMPERATURE-COMPENSATING STRUCTURE

Filed Dec. 13, 1961

INVENTOR:
ANDREW M. MARFUT,
BY *Philip L. Schlamp*
HIS ATTORNEY.

3,194,998
MAGNETIC TEMPERATURE-COMPENSATING
STRUCTURE
Andrew M. Marfut, Scotia, N.Y., assignor to General
Electric Company, a corporation of New York
Filed Dec. 13, 1961, Ser. No. 159,002
6 Claims. (Cl. 313—156)

My invention relates generally to means for temperature compensating permanent magnets. More particularly, my invention pertains to new and improved R.F. apparatus incorporating crossed-field electric discharge devices and permanent magnets, and to new and improved means for temperature compensating the permanent magnets in such apparatus.

A voltage tunable magnetron package of the type disclosed and claimed in copending U.S. application S.N. 146,162—D.J. Hodges, filed October 19, 1961 and assigned to the same assignee as the present invention is an example of R.F. apparatus of the type to which the present invention is particularly applicable. This type of package generally incorporates a crossed-field electric discharge device and a permanent magnet assembly for providing a desired operating magnetic field extending generally coaxially through the device; and thermally-caused variations in magnetic field strength can adversely affect operation of the device. More specifically, a voltage tunable magnetron package generally comprises an R.F. circuit having a voltage tunable magnetron tube mounted therein, D.C. circuit means for applying appropriate operating potentials to the electrodes of the magnetron tube and a magnet assembly. The magnet assembly generally includes a permanent magnet having closely spaced opposed pole pieces defining a gap and means for mounting the magnetron tube and circuit means therefor in a predetermined adjusted position with respect to the magnet gap, and with the magnetic field therein extending generally coaxially through the magnetron tube. In some constructions it is desirable that the magnet assembly be of the "bowl" type or, in other words, of the type comprising opposed pole pieces supported by a yoke section which completely encloses the contained magnetron tube and magnetron circuit.

In the described magnetron package and particularly the type including a bowl-magnet, heat from the operating magnetron and varied ambient temperatures have a tendency to change the temperature of the magnet assemblies substantially. This tends to affect the strength of the magnet, or the flux density in the gap, which can adversely affect the operation of the magnetron. Specifically, as the temperature of the magnet increases, its field strength, or gauss in the gap defined by the opposed pole pieces, decreases which can change or degrade operational performance in general. One manner of coping with this problem is to provide compensating auxiliary electronic circuitry adapted to correct for thermally-caused changes in magnet field strength. Another is to provide means adapted for maintaining the magnet assembly at a uniform operating temperature. Both of these approaches, however, are undesirable inasmuch as they may add to the cost, weight and/or complexity of the structure. Another proposed solution involves the use of temperature-compensating alloys in the gap defined by the pole pieces. This is also undesirable in that it would alter the magnetic field configuration in the gap which, in turn, would undesirably affect operating frequency, power output and noise content of the output of the package and would degrade operating performance in general.

Accordingly, a primary object of my invention is to provide a new and improved thermally-compensated permanent magnet structure.

Another object of my invention is to provide a new and improved voltage tunable magnetron package including a new and improved thermally-compensated magnet assembly.

Another object of my invention is to provide a new and improved voltage tunable magnetron package including a new and improved means for compensating for thermal variations without reliance upon auxiliary electronic compensating circuitry and without adversely affecting a desired field configuration in the magnet gap.

Further objects and advantages of my invention will become apparent as the following description proceeds and the features of novelty which characterize my invention will be pointed out with particularity in the claims annexed to and forming part of this specification.

In carrying out the object of my invention, I provide a unitary package assembly comprising a circuit subassembly including an R.F. circuit having a coaxial output and a voltage tunable magnetron tube mounted therein. This subassembly is contained in a bowl-type magnet subassembly comprising a pair of spaced opposed pole pieces defining a gap therein and a permanent magnet yoke section supporting the pole pieces and defining the continuous lateral walls of the bowl-type structure. The circuit subassembly is mounted in a predetermined adjusted position in the bowl-type magnet in which position the magnetron tube is disposed in the gap between the pole pieces and is positioned for being generally coaxial with a magnetic field in the gap. The magnet subassembly preferably comprises a pair of opposed dish-shaped permanent magnet segments secured together to define the mentioned bowl-type permanent magnet structure. Each of the magnet segments is enclosed in a generally dish-shaped jacket segment formed of a high thermal conductivity material and to include bored bosses for receiving bolts for securing the segmented portions of the assembly together. Provided at the equator of the magnet assembly and interposed between the walls of the magnet and jacket segments in substantial intimate thermal contact therewith are circumferentially extending strips of a temperature compensating material. This material is non-permanent magnetic and has a large negative temperature coefficient of magnetic permeability. Washer-like elements formed of the same material are provided about the pole pieces at a location relatively remote from the gap defined by the pole pieces. These washer-like elements provide for a vernier, or trimming, adjustment of the compensation attained with the compensating elements located at the equator of the magnet assembly.

For a better understanding of my invention, reference may be had to the accompaning drawing in which.

Figure 1:
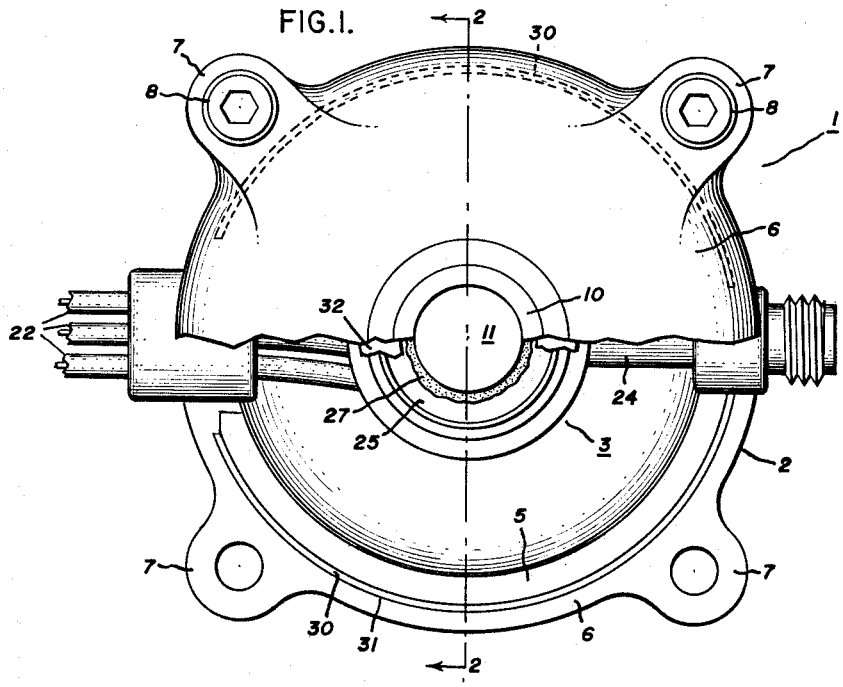
FIGURE 1 is a fragmentary plan view of an embodiment of my invention.
Figure 2:
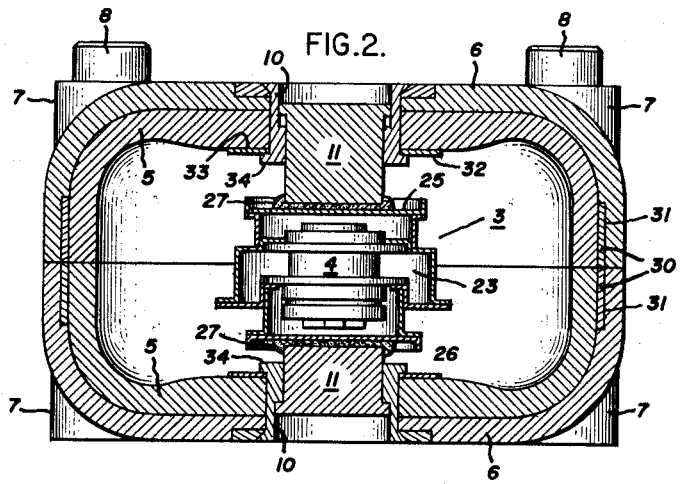
FIGURE 2 is a sectional view taken along the line 2—2 in FIGURE 1 and looking in the direction of the arrows.

Referring to FIGURES 1 and 2, there is shown a voltage tunable magnetron package generally designated 1 and including a bowl-type magnet subassembly 2 containing a circuit subassembly 3 in which is mounted a voltage tunable magnetron tube 4.

The magnet subassembly 2 comprises an opposed pair of dish-shaped permanent magnet segments 5, each securely fitted in a die-cast non-magnetic mount or jacket 6 which is also generally dish-shaped. Additionally, for reasons to be described in detail hereinafter, the mounts or jackets 6 are formed of a high thermal conductivity material such as aluminum or any other material having similar thermal characteristics. Also, the jackets are formed with bosses 7 for the passage therethrough of bolts 8 for securing the elements comprising the magnet subassembly together in the manner illustrated and to define an enclosed space therein. Additionally, the magnet segments 5 and jackets 6 are formed to include coaxial apertures into which are suitably tightly fitted tubular insert elements 10. Slidably and removably positioned in each insert element 10 is a cylindrical pole piece 11 formed preferably of a high permeability magnetic material such as soft iron. The pole pieces 11 extend coaxially in the space defined by the segments 5, and the inner ends of the pole pieces are closely spaced for defining therebetween a gap in which is concentrated a magnetic field which extends generally coaxially through the voltage tunable magnetron tube 4.

Figure 3:
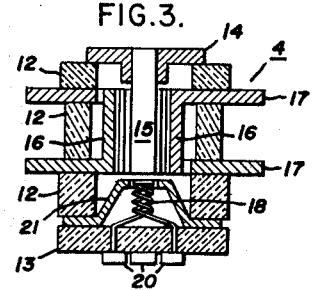
FIGURE 3 is a sectional view of the voltage tunable magnetron tube illustrated in position in the R.F. circuit in FIGURE 2.

The voltage tunable magnetron tube 4 can be of the type disclosed and claimed in U.S. Patent No. 2,930,933 of G. J. Griffin, Jr. et al., issued March 29, 1960 and assigned to the same assignee as the present invention. Such a tube is illustrated in section in FIGURE 3 to bring out the relative location of electrode contacts and thereby to facilitate the description and understanding of the R.F. and D.C. circuit requirements of the presently disclosed structure. Briefly, and as illustrated in FIGURE 3, the magnetron tube 4 is constructed to include stacked alternate ceramic and metal elements. The ceramic elements generally include a plurality of cylindrical ceramic wall sections 12 and an apertured disk-like ceramic end cap 13. The metal members are suitably brazed to or between opposed surfaces of the ceramic elements to complete a hermetically sealed evacuated envelope and include a metal end cap 14 carrying a cylindrical non-emissive cathode 15 extending centrally in a cylindrical space defined by a plurality of anode segments generally designated 16. The anode segments 16 are arranged in a pair of interdigital sets, with each segment being joined to a washer-like contact ring 17. The rings 17 are each sealed between a pair of ceramic cylinders 12 and are thus mutually insulated. A filamentry emitter 18 is suitably mounted on the ceramic end cap 13 with leads sealed therethrough and connected to a pair of button-like contact members 20 bonded to the outer surface of the ceramic end cap 13. A frusto-conical control electrode 21 is sealed between one of the ceramic insulators 12 and the ceramic end cap 14 and is positioned about the emitter 18. By means of a lead not shown and which extends also in a sealed manner through the ceramic end cap 13, an electrical connection is made between the control electrode 21 and a third button-like contact member 20 bonded to the outer surface of the ceramic end cap.

In the presently disclosed structure the magnetron tube 4 is adapted for operating while axially aligned with the magnetic field extending between pole pieces 11 of the above-described magnet assembly when mounted in the R.F. circuit 3 and the operation of said magnetron tube is directly dependent on the magnitude and configuration of the magnetic field. Additionally, the magnetron requires for operation the application of suitable D.C. potentials to the various electrodes. These potentials are supplied through the metal end cap 14 and the contact buttons 20 and the necessary connections are provided through D.C. leads generally designated 22 in FIGURE 1 which extend through the sidewall of the magnet assembly. Suitable D.C. contacts (not shown) connect the leads 22 to appropriate ones of the tube contacts 14 and 20.

The R.F. circuit designated 3 in FIGURE 2 is of the so-called "pill-box" type disclosed and claimed in the above-mentioned Hodges co-pending application. The R.F. circuit 3 makes appropriate electrical contact with the anode contacts 17 on the magnetron 4 and includes an output cavity generally designated 23. By suitable output coupling means, generally designated 24 in FIGURE 1 and not fully shown, R.F. energy is coupled out of the cavity 23, as by means of a coupling loop in the cavity 23, for use externally of the package.

As seen in FIGURE 2, the R.F. circuit 3 includes upper and lower cover-like elements 25 and 26, respectively. The circuit can be secured in a predetermined adjusted position in the magnet assembly through the agency of a quantity of a thermally conductive bonding material, or potting compound, generally designated 27 interposed between the elements 25 and 26 and respective ones of the pole pieces 11. This manner of mounting of magnetron circuit in the magnet assembly does not constitute part of the present invention but is disclosed and claimed in the above-mentioned co-pending Hodges application.

During operation of the structure described to this point, heat is incidentally generated by the magnetron 4 which, by means of radiation and conduction through the bonds 27 and pole pieces 11, is transmitted to the magnet segments 5 and the jacket 6 and is eventually radiated to the outer environments. This is a desirable manner of dissipating the generated heat and, indeed, is necessary for the satisfactory operation of the package. However, during this heat-dissipating process the heating of the permanent magnets 5 has the undesired effect of adversely affecting the strength of the magnet field, or flux density, between the pole pieces 11. Specifically, as the temperature of the magnet segments 5 increases, the remanent induction of the material of which such segments are formed becomes less, and, thus, the strength of the magnetic field in the gap defined by the pole pieces and extending coaxially through the magnetron tube becomes weaker. This adversely affects the operation of the magnetron.

My invention minimizes any tendency for the magnetic field strength to vary with temperature variations of the permanent magnet segments 5. Specifically, and as seen in FIGURES 1 and 2, my structure includes arcuate strips of temperature-compensating material 30 interposed between the outer walls of the magnet segments 5 and the inner walls of the jackets 6. As shown in FIGURE 2, the strips 30 are positioned in recesses 31 formed in the jackets 6 and located at the rim portions thereof. Four of the strips 30 are provided, two in the upper and two in the lower sections of the magnet assembly and with a strip on either side of the D.C. leads 22 and R.F. output 24. When the upper and lower sections of the magnet assembly are joined in the manner shown in FIGURE 2 the opposed strips 30 engage and cooperate to, in effect, serve as a single equatorially-located strip.

The strips 30 are formed of a non-permanent magnetic material having a large negative temperature coefficient of magnetic permeability. As the temperature of such a material increases, the magnetic permeability thereof decreases. When the strips 30 are located on the permanent magnets 5 as shown in FIGURE 2, they load down or partially short out a portion of the permanent magnet structure. As the temperature of the magnet increases, the remanent induction of the magnet decreases which one might expect would result in a decrease of the strength of the magnetic field in the gap defined by the pole pieces. However, the permeability of the compensator strips also decreases, decreasing the loading or shorting effect of these compensating strips for thus causing the strength of the magnetic field in the gap to remain more constant. In forming the strips 30, materials having negative temperature coefficients in the range of $-.8$ to $-1.2$ per degree centigrade are suitable. Also, it is to be understood that the larger the negative temperature coefficient of the material used the lesser will be the amount of material required for a desired compensating effect. Thus, when employed in cooperation with the magnet segments 5 the strips 30 serve to compensate for any tendency toward a decrease in strength of the magnetic field resulting from temperature increases of the magnet segments. An example of a temperature-compensating material of which the strips 30 may be suitably formed is an alloy composition of nickel and iron which is known by the trade name of Carpenter Temperature Compensator "32" and is available through the Carpenter Steel Co. of Reading, Pennsylvania.

My disclosed structure is particularly adapted for effecting the desired thermal compensation through the particular location of the compensating material and the substantial area contact provided for in my structure between the strips 30 and the heated magnet segments 5. Specifically, in my disclosed structure the strips 30 are encased or imbedded in the magnet assembly between the walls of the magnet segments 5 and the jacket 6. Also, all of the area of the inner surfaces of the strips are in direct intimate thermal contact with the magnet segments. This assures substantial area contact and a greater heat-transferring relation between the heated magnet segments and the to be heated compensating strips. Thus, greater conformity of the strip temperature to the temperature of the magnet segments is obtained. Also, the strength of the field in the gap defined by the pole pieces is the sum total of the magnetic strength of incremental sections of the permanent magnet material of which the segments 5 are formed. Therefore, in my structure the large area intimate contact of the compensating strips 30 with a large mass of the magnetic material of which the segments 5 are formed provides for thermal compensation of a greater amount of incremental temperature-affected sections of the magnet segments. Conformity in temperature between the strips 30 and the magnet segments is enhanced by the provision of the high thermal conductivity jackets 6 and the intimate heat transferring relationship between the jackets and the strips 30. The jackets 6 enable the heat to transfer rapidly and uniformly from the pole regions of the bowl magnet to the equatorial regions at which the strips are located. Thus, the strips can be heated relatively rapidly to the temperature of the magnet segments to assure the desired compensating effect of the inverse magnetic characteristic thereof.

Further, the disposition of the strips on the external wall sides of the magnet segments 5 locates the strips in regions remote from the magnetic field between the pole pieces 11. Thus, my structure is adapted for providing the desired compensation without adversely affecting the configuration of the magnetic field in the gap which could result in undesirable alterations of frequency, power output, noise content of output and general degradation of performance of the magnetron 4 and the package in general.

The above-described strips 30 provide the major magnetic thermal compensation afforded by the disclosed structure. However, I have also provided means for introducing a vernier adjustment, or trimming compensation, to the compensation obtained with the strips 30. Specifically, and as illustrated in FIGURE 2, I have provided washer-like compensating elements 32 disposed in intimate substantial area thermal contact with a planar rim area 33 formed on the inner surface of each of the magnet segments 5. The areas 33 are disposed concentric with the inserts 10 in which the pole pieces 11 are fitted and are spaced substantially from, or remotely located relative to, the field-defining inner ends of the pole pieces 11. The elements 33 are retained in the relationship with the magnet segments illustrated by having the inner ends thereof disposed between the rims of the apertures in the magnet segments having the inserts 10 fitted therein and flanges 34 formed on the inner end of the inserts 10. In this arrangement the elements 32, by virtue of the annular intimate contact with the magnet segments 5, are adapted for being heated to substantially the same temperature as the magnet segments and compensating effectively for variations in magnet field strength tending to result from temperature variations of the magnet material. The vernier adjustment or trimming compensation is obtained by adjusting the dimension of these washer-like compensators to provide a desired adjusted amount of compensation in accordance with the amount of vernier, or trimming, adjustment required in connection with the compensation obtained with the strips 30. In general, increasing the diameter of thickness of these washers increases the amount of compensation obtained. Still further, and as indicated above, the elements 32 are located in regions remote from the magnet gap defined by the inner ends of the pole pieces 11 and where a small degree of temperature compensation is effected without adversely affecting the configuration of the magnetic field in the gap.

Thus, it will be seen from the foregoing that I have provided means for temperature compensating permanent magnets which do not affect the configuration of the magnetic field between the pole pieces. Also, I have provided an effective temperature compensating permanent magnet structure which can be employed to advantage in providing an improved voltage tunable magnetron package and which obviates the need for electronic circuitry to correct for thermally caused variations in field strength or for providing means to maintain the magnets constantly within a predetermined desired operating temperature range.

While I have shown and described a specific embodiment of my invention, I do not desire my invention to be limited to the particular form shown and described, and I intend by the appended claims to cover all modifications within the spirit and scope of my invention.

What I claim as new and desire to secure by Letters Patent of the United States is:

1. A permanent magnet structure comprising a continuous permanent magnet yoke, a pair of opposed pole pieces supported coaxially by said yoke to define a single opposed polarity gap in said magnet structure, the intermediate portion of said yoke being substantially removed from said gap to define an open space therebetween, and means for compensating said structure for variations in flux strength of a magnetic field in said gap tending to result from temperature variations of said magnet, comprising at least one magnetic shunt strip element engaging an outer surface of said yoke, said element comprising a non-permanent magnetic material having a negative temperature coefficient of magnetic permeability, being in intimate substantial area contact with said surfaces of said magnet and being located remote from said gap to avoid alterations in the configuration of said field therebetween.

2. Radio frequency apparatus comprising a magnet assembly including a pair of opposed spaced opposite polarity pole pieces, a circuit assembly having an electric discharge device mounted therein in a predetermined adjusted position transversely between said pole pieces and relative to a magnetic field therebetween, and said magnet assembly further including a permanent magnet yoke section supporting said pole pieces, and means for compensating said structure for variations in flux strength of said magnetic field tending to result from temperature variations of the operation of said device comprising a shunt element in intimate substantial area contact with a surface portion of said yoke section, and said element comprising a non-permanent magnetic material having a negative temperature coefficient of permeability and being located remote from the inner ends of said pole pieces to avoid alterations of the configuration of said field therebetween.

3. Radio frequency apparatus comprising a continuous permanent magnet material yoke structure, the ends of said yoke carrying a pair of coaxial opposed magnetic pole pieces supported in said yoke and defining a magnetic gap therebetween, a circuit assembly in said space, a magnetron device mounted in said circuit assembly and disposed in said gap in a predetermined adjusted position relative to a magnetic field in said gap, means for compensating said magnet for variations in flux strength of said magnetic field tending to result from temperature variations of said magnet caused by operation of said device comprising at least one extending elongated shunt strip located along the intermediate region of said yoke and in intimate substantial area contact therewith, said strip comprising a non-permanent magnetic material having a negative temperature coefficient of magnetic permeability, said strip being spaced from and remote from said gap so as not to be immediately adjacent said magnetron in said gap.

4. Radio frequency apparatus according to claim 3, and further characterized by an annular element of the same magnetic characteristics as said strip being in intimate substantial area contact with the surface of said magnet about at least one of said pole pieces and at a point remote from said gap.

5. Radio frequency apparatus comprising a permanent magnet material yoke structure defining a hollow space, said yoke structure carrying a pair of opposed pole pieces supported coaxially in said magnet and defining a magnetic gap therebetween, the intermediate portion of said yoke structure being spaced from said gap defining pole pieces to define an open space therebetween, a circuit assembly in said gap, a voltage tunable magnetron device mounted in said circuit assembly and disposed in said gap in a predetermined adjusted position relative to a magnetic field in said gap, means for compensating said magnet for variations in flux strength of said magnetic field tending to result from temperature variations of said magnet caused by operation of said device comprising an elongated strip located along the yoke about the intermediate region of said yoke away from said gap and in intimate substantial contact with the outer surface thereof, said strip comprising a non-permanent magnetic material having a negative temperature coefficient of permeability, and a high heat conducting cover covering said magnet and in intimate thermal contact with said magnet and strip.

6. Radio frequency apparatus comprising a magnet structure including a pair of opposed dish-shaped permanent magnet segments joined at the rims thereof to define an enclosed space and carrying a pair of pole pieces extending in opposed spaced coaxial relation in said space to define a gap therein, a circuit assembly in said space having an electric discharge device mounted therein and disposed in said gap in predetermined adjusted position relative to a magnetic field in said gap, and means for compensating said magnet structure for variations in flux strength of said magnet tending to result from temperature variations of said magnet segments comprising elongated compensating strips extending circumferentially about the outer rim surface portions of each of said segments in intimate substantial area contact therewith, a flat washer-like compensating element mounted in intimate substantial area contact with said segments about each of said pole pieces and remote from the inner ends thereof, and said strips and washer-like elements comprising a non-permanent magnetic material having a negative temperature coefficient of magnetic permeability, and a high heat conducting outer jacket encasing each said segments and strips and in intimate heat transferring relation therewith.

References Cited by the Examiner
UNITED STATES PATENTS

| | | | |
|---|---|---|---|
| 1,411,311 | 4/22 | Sullivan | 317—131 X |
| 1,675,884 | 7/28 | Elmen | 336—179 X |
| 1,706,172 | 3/29 | Kinnard | 336—179 X |
| 2,964,670 | 12/60 | Bliss | 315—3.5 |
| 2,966,609 | 12/60 | Turner | 315—3.5 |
| 3,020,445 | 2/62 | Weinstein | 315—39.63 |
| 3,020,446 | 2/62 | Bessarat. | |
| 3,028,570 | 4/62 | Taylor | 336—179 |
| 3,127,538 | 3/64 | Dench | 315—3.5 |

GEORGE N. WESTBY, *Primary Examiner.*
ARTHUR GAUSS, *Examiner.*